United States Patent
Takeguchi et al.

(10) Patent No.: US 6,567,422 B1
(45) Date of Patent: May 20, 2003

(54) NETWORK SYNCHRONIZATION CONTROLLER AND TIMING LOOP PREVENTION METHOD

(75) Inventors: Koji Takeguchi, Kawasaki (JP); Hirotaka Morita, Kawasaki (JP); Nobuhiro Rikitake, Kawasaki (JP); Ryuichi Moriya, Kawasaki (JP); Ken Mizukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/363,357

(22) Filed: Jul. 29, 1999

(30) Foreign Application Priority Data

Jan. 19, 1999 (JP) ............................................. 11-010286

(51) Int. Cl.[7] ................................................. H04J 3/06
(52) U.S. Cl. ........................ 370/503; 370/509; 370/510; 370/512
(58) Field of Search ................................ 370/216, 222, 370/503, 507, 509–510, 512, 518, 907, 324; 359/119, 138, 161

(56) References Cited

U.S. PATENT DOCUMENTS 5,886,996 A * 3/1999 Wolf ........................... 370/507

6,185,216 B1 * 2/2001 Chapman ..................... 370/503

FOREIGN PATENT DOCUMENTS

| JP | 5-056023 | 3/1993 |
| JP | 7-2355918 | 9/1995 |
| JP | 9-064842 | 3/1997 |
| JP | 9-219687 | 8/1997 |
| JP | 10-093519 | 4/1998 |
| JP | 10-145321 | 5/1998 |

* cited by examiner

Primary Examiner—Dang Ton
Assistant Examiner—Thong N. Vu
(74) Attorney, Agent, or Firm—Katten Muchin Zavis Roseman

(57) ABSTRACT

A network synchronization controller and method for effectively preventing a timing loop from happening in a synchronous network. A clock status message controller, disposed in each network element on the network, produces and sends clock status messages which are each composed of clock quality data and synchronization control data. The clock quality data indicates the quality level of a clock signal that each network element supplies to its neighboring network elements. The synchronization control data contains information to be used to make the network synchronized with a single reference timing source. A clock selector chooses one of the clock signals received from other network elements, based on the clock status messages received along with the clock signals.

20 Claims, 15 Drawing Sheets

NETWORK SYNCHRONIZATION CONTROLLER AND TIMING LOOP PREVENTION METHOD

BACKGROUND OF THE INVENTION

1. Field of the Invention

The present invention relates to a network synchronization controller and a timing loop prevention method. More particularly, the present invention relates to a controller which establishes timing synchronization within a network, and to a method of preventing the occurrence of a timing loop within a network.

2. Description of the Related Art

Today's digital telecommunications systems exploit various data multiplexing techniques to fully utilize the available transmission bandwidth and provide economical data transport services. Synchronous Digital Hierarchy (SDH) is a typical digital transmission architecture with highly sophisticated multiplexing facilities. SDH offers various high-speed data services, as well as defining multiplexing methods to interface with existing low-speed telecommunication services. This ITU-T standard technology is accepted as a next-generation data communications infrastructure, and many practical systems are being developed.

According to the concept of SDH, all network elements (NEs) within a network must operate exactly in synchronization with each other. To this end, the network provides a single reference timing source, or clock, with a predefined frequency and required accuracy. Such a reference clock signal is distributed over the network, allowing each network element to keep its local timing system synchronized with the reference timing. To ensure the establishment of network synchronization, some conventional systems use a synchronization status message byte (SSMB) defined as part of SDH section overhead. SSMB is actually a four-bit data field allocated in the lower half of S1 byte, which indicates the quality level of a clock signal being used. The timing distribution path in an SDH network is established and maintained by using an SSMB-based synchronization messaging mechanism.

FIG. 14 shows an example of timing distribution in a conventional SDH network. This SDH network 200 involves four network elements NEa to NEd interconnected in a ring topology. On the top of the ring, the network element NEa is directly coupled to a reference timing source CLK1, and its operation is synchronized with it. This reference clock signal CLK1 is distributed over the ring in the counter-clockwise direction, thus forming a timing distribution path of (NEa→NEb→NEc→NEd). All the network elements NEa to NEd on this path are timed by the reference clock signal CLK1.

The timing distribution path may not be permanent, but can be reconfigured, if required. In case of a ring failure, for example, each network element switches its clock signal sources according to the clock quality status information provided in the form of SSMB, trying to reestablish the network synchronization.

The above-described conventional system, however, has a problem in that its messaging mechanism lacks detailed information that is required to reestablish the network synchronization, and thus cannot avoid the occurrence of an unwanted timing loop. FIG. 15 illustrates a timing loop created in the conventional SDH network 200 of FIG. 14. It is assumed that a ring failure has occurred between two network elements NEa and NEb. Because the reference clock signal CLK1 from NEa is disrupted, NEb now chooses another clock signal supplied from NEc in an attempt to synchronize itself with that signal. NEc, on the other hand, uses a clock signal supplied from NEb for synchronization, meaning that the network element NEc operates at the timing that derives from NEc itself. The last network element NEd is then timed by a clock signal supplied from NEc. This results in a timing loop produced in the SDH network 200, where NEb, NEc, and NEd operate in synchronization with each other, but no qualified reference timing such as CLK1 is present.

As explained above, network elements in a conventional network switch reference timing signals without considering their origins. This is because of the lack of detailed information regarding the sources of clock signals and the like, which is necessary for reliable network synchronization. As a result, some network elements happen to choose a clock signal that is derived from themselves, making a timing loop.

A timing loop disrupts the synchronization within a network and makes it difficult for the network to recover from failure by itself. It also affects the performance of a network, causing jitter (short-term phase variations) and wander (long-term phase variations including seasonal changes). Accordingly, there is a demand for a robust network synchronization method which avoids the occurrence of unwanted timing loops, as well as being free from variations in clock frequencies and phases.

SUMMARY OF THE INVENTION

Taking the above into consideration, an object of the present invention is to provide a network synchronization controller which prevents the occurrence of a timing loop in a more effective and efficient manner.

To accomplish the above object, according to the present invention, there is provided a network synchronization controller which controls a process of establishing timing synchronization within a network. This network synchronization controller comprises a clock status message controller, disposed in each network element on the network, which produces and sends a clock status message composed of clock quality data and synchronization control data. The clock quality data indicates the quality level of a clock signal that the each network element supplies to its neighboring network element, while the synchronization control data includes information to be used to make the network synchronized with a single reference timing source. The controller further comprises a clock selector, disposed in each network element, which selects one of the clock signals that each network element receives, based on the clock status messages received along with the clock signals.

It is another object of the present invention to provide a method of preventing the occurrence of a timing loop in a more effective and efficient manner.

To accomplish this second object, according to the present invention, there is provided a method of preventing a network from forming a timing loop. This method comprises the steps of: (a) producing a clock status message composed of clock quality data and synchronization control data and sending the clock status message, together with a clock signal being selected, from each network element to a neighboring network element thereof; and (b) selecting one of the clock signals received from other network elements, based on the clock status messages received along with the clock signals. Here, the clock quality data indicates the quality level of the clock signal, and the synchronization control data includes information to be used to establish network synchronization.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
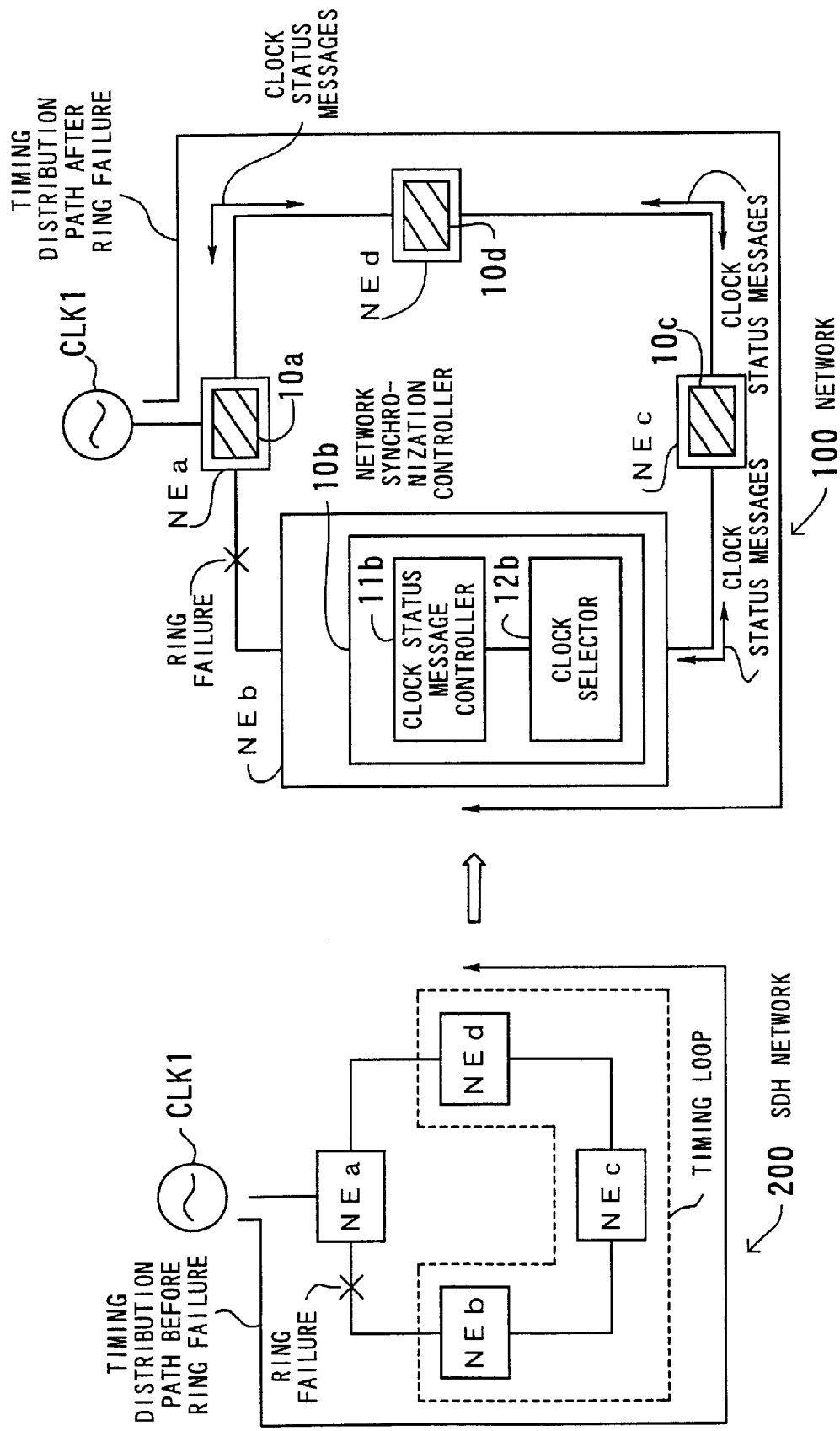
FIG. 1 is diagram that shows the concept of a network synchronization controller according to the present invention, in contrast to a conventional network.

FIG. 1 presents the concept of a network synchronization controller according to the present invention. On the right-hand side of FIG. 1 is a network 100 in which four network elements NEa to NEd are connected in a dual ring topology. Network synchronization controllers 10a to 10d are disposed in those network elements NEa to NEd to control a process of clock timing synchronization within the network 100. Each network synchronization controller comprises a clock status message controller and a clock selector. Take the network synchronization controller 10b for instance. This controller 10b comprises a clock status message controller 11b which produces clock status messages and sends them out to its neighboring network elements.

According to the present invention, the clock status message is composed of two information components: (1) clock quality data that indicates the quality level of a clock signal to be supplied, and (2) synchronization control data for use in establishing network synchronization with a single clock source. The clock quality data is actually packed in the lower four bits of S1 byte, which is known as the Synchronization Status Message Byte (SSMB) field defined as part of SDH overhead. Besides using this SSMB, the present invention introduces synchronization control data to establish network synchronization, as will be described in detail later.

Such clock status messages are exchanged between the network elements NEa to NEd. Referring again to the network synchronization controller 10b, it receives clock status messages from its neighboring network elements NEa and NEc. Reading the received messages, the clock selector 12b chooses an appropriate clock signal from among those available at that time for use in the timing synchronization. Although FIG. 1 does not provide the details, the other network synchronization controllers 10a, 10c, and 10d also have a like clock status message controller and like clock selector.

For comparison purposes, a conventional network 200 is illustrated on the left-hand side of FIG. 1. Network elements may be equipped with some synchronization messaging facilities, but they are unlike the proposed network synchronization controller. In this system, the network element NEa serves as a master network element, supplying a reference clock signal CLK1 with which all the elements in the network 200 should be synchronized. Here, the reference clock signal CLK1 is distributed in the counter-clockwise direction along the ring (i.e., NEa→NEb→NEc→NEd). In case of a ring failure between NEa and NEb, for example, what is known as a timing loop would occur in a portion of the SDH network 200 as indicated by the broken line in FIG. 1. Under this timing loop condition, three network elements NEb to NEd appear to operate in synchronization with each other. In actuality, however, no qualified timing reference is present in the loop, thus resulting in service degradation (i.e., increased slips).

Unlike the conventional network 200 mentioned above, the proposed network 100 prevents the occurrence of a timing loop by employing the network synchronization controllers 10a to 10d. Assume that the reference clock signal CLK1 has originally been distributed in the counter-clockwise direction as in the network 200, and that a ring failure occurs at some point between NEa and NEb. In such a problem situation, the network elements on the SDH network 100 exchange clock status messages, allowing each individual network element to choose again an appropriate reference timing source. The present invention makes it possible to smoothly establish an alternate distribution path for the reference clock signal CLK1. That is, the signal CLK1 now begins to flow in the clockwise direction (i.e., NEa→NEd→NEc→NEb), without creating a timing loop. More details of this mechanism will be discussed in later sections.

Figure 2:
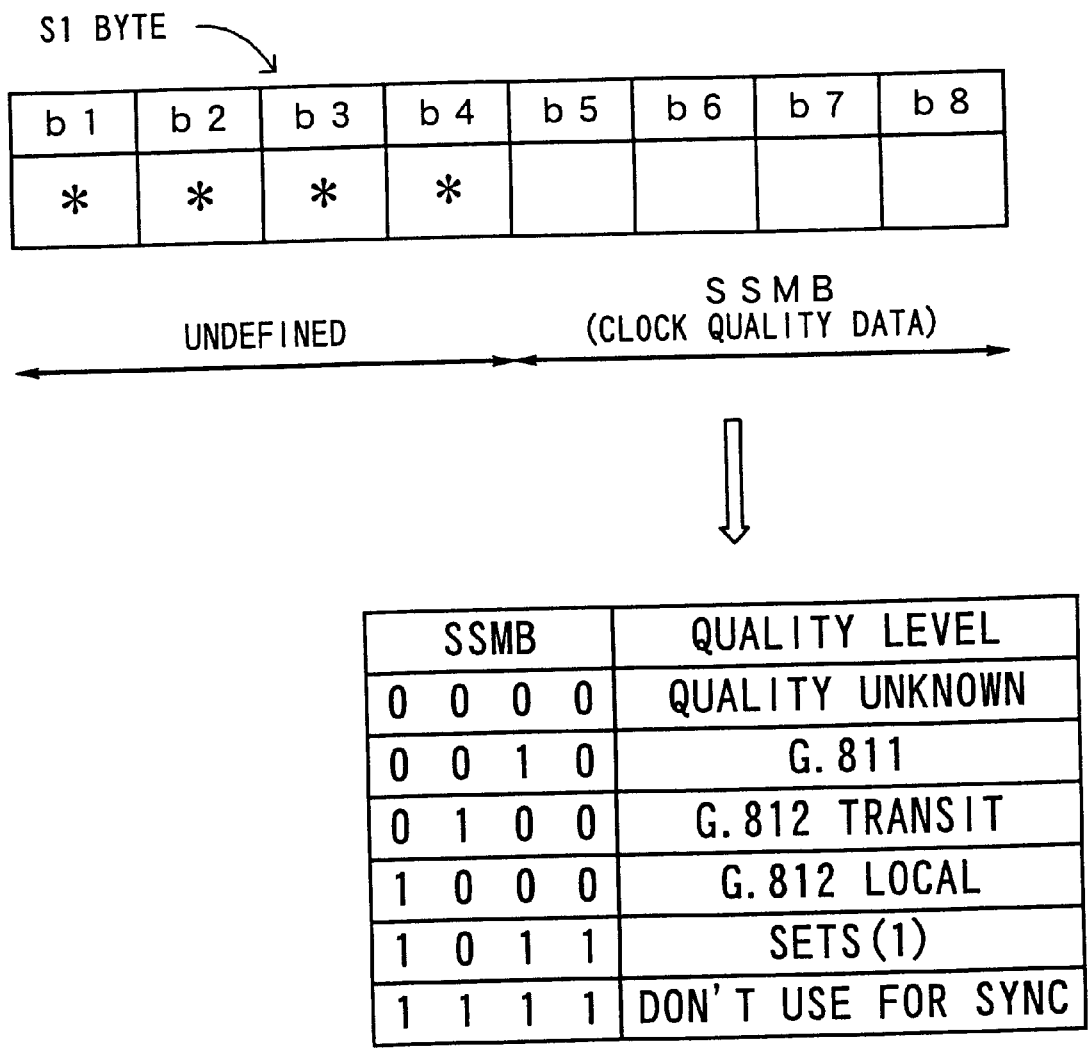
FIG. 2 is a diagram which shows the structure of S1 byte, including SSMB.

Referring next to FIG. 2, the structure of S1 byte will be explained below. The related ITU-T recommendations define S1 byte as part the SDH overhead. While its upper four bits are left undefined, the lower four bits (i.e., b5 through b8) of S1 byte are allocated to transport a synchronization status of a network element, which is referred to as the synchronization status message byte (SSMB), or the clock quality data. According to the ITU-T recommendation G.708, the following four-bit codes are defined to indicate different clock quality levels:

0000: Quality Unknown
0010: G.811 Primary Reference Source (PRS)
0100: G.812 Transit
1000: G.812 Local
1011: G.813 Synchronous Equipment Timing Source (SETS)
1111: Don't Use for Synchronization (DUS) where SETS means that the network element is running in holdover mode. Among the clock quality levels listed above (excluding "0000" and "1111"), the highest is "0010"

(G.811 PRS) and the second is "0100" (G.812 Transit). They are followed by "1000" (G.812 Local), and the lowest is "1011" (SETS). The bit pattern "1111" plays an important role in synchronization distribution, which is called a DUS message in this description. DUS messages, when transmitted from one network element along with a clock signal, will inhibit the receiving network element from choosing the supplied clock signal as its reference timing source.

Referring next to FIGS. 3 to 7, the following section will describe a first embodiment of the present invention, in which the proposed network synchronization controller is implemented in an SDH network.

Figure 3:
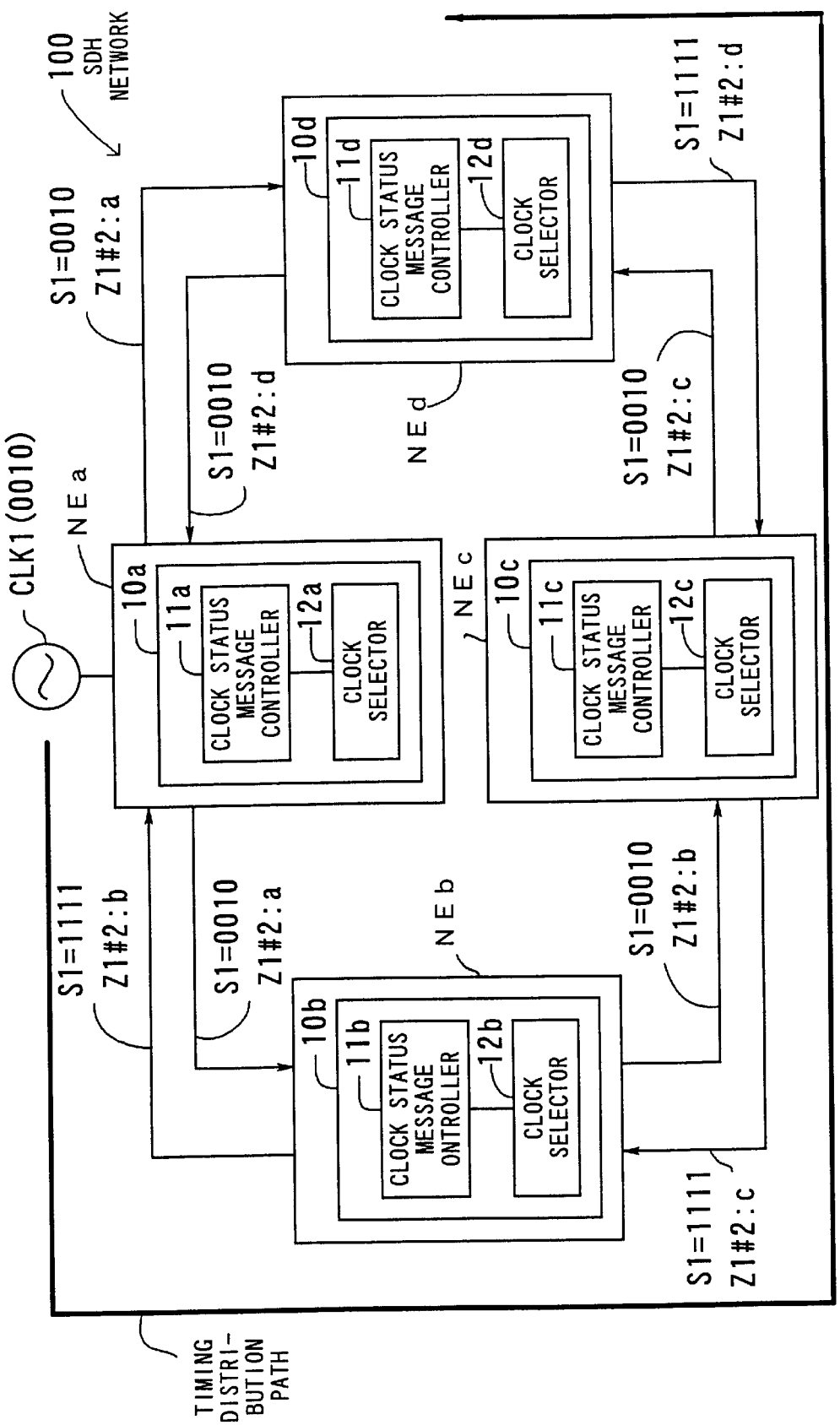
FIGS. 3 to 7 are diagrams which explain the operation of an SDH network according to a first embodiment of the present invention.

The operation of this SDH network is depicted in FIGS. 3 to 7. Referring first to FIG. 3, there are four network elements NEa to NEd connected in a dual ring topology, and the network element NEa (master network element) supplies the other nodes NEb to NEd with a reference clock signal CLK1 with; a quality level of "0010" for network synchronization purposes. The network elements NEa to NEd are equipped with network synchronization controllers 10a to 10d, which comprise clock status message controllers 11a to 11d and clock selectors 12a to 12d, respectively.

Each network element has a unique identifier. The clock status message controllers 11a to 11d transmits such identifiers as synchronization control data, together with the clock quality data "0010." According to the first embodiment of the present invention, this synchronization control data is carried by the second Z1 byte (Z1#2) defined as part of the overhead portion of SDH frames. While the SDH overhead originally reserved three "Z1" bytes (Growth bytes) for future use, one of the three bytes has been renamed to "S1" byte (Synchronization status message byte). Because of this historical reason, these bytes will be referred to as "S1," "Z1#2," and "Z1#3" in this description. The present invention proposes various usage patterns of the upper four bits of S1 byte and the two Z1 bytes to transport synchronization control data. More specifically, Z1#2 is used in the first embodiment; the upper four bits of S1 byte and Z1#2 are used in the second embodiment; the upper four bits of S1 byte and both Z1#2 and Z1#2 bytes are used in the third embodiment, as will be described later in detail.

When the clock selectors 12a to 12d have selected clock signals supplied from their neighboring network elements, the clock status message controllers 11a to 11d send back DUS messages "S1=1111" to those source network elements. (Here, "S1=1111" denotes that the bit pattern of DUS message is carried by the lower four bits of S1 byte; the remaining upper four bits are left undefined, and thus omitted in FIGS. 3 to 7.) More specifically, the clock status message controller 11a in the network element NEa transmits a clock status message (S1=0010, Z1#2:a) to its neighboring network elements NEb and Ned, where "Z1#2:a" means that the second Z1 byte conveys the identifier of NEa. Likewise, the clock status message controller 11b in NEb sends (S1=0010, Z1#2:b) to NEc. It also send a DUS message (S1=1111, Z1#2:b) to NEa, since its local clock selector 12b has selected a clock signal supplied from NEa. The clock status message controller 11c in NEc transmits (S1=0010, Z1#2:c) to NEd. It also sends a DUS message (S1=1111, Z1#2:c) to NEb, since its local clock selector 12c has selected a clock signal supplied from NEb. The clock status message controller 11d in NEd sends (S1=0010, Z1#2:d) to NEa. It also sends a DUS message (S1=1111, Z1#2:d) to NEc, since its local clock selector 12d has selected a clock signal supplied from NEc. As a result, the reference clock signal CLK1 with a quality level of "0010" is distributed in the counter-clockwise direction (i.e., NEa→NEb→NEc→NEd).

Figure 4:
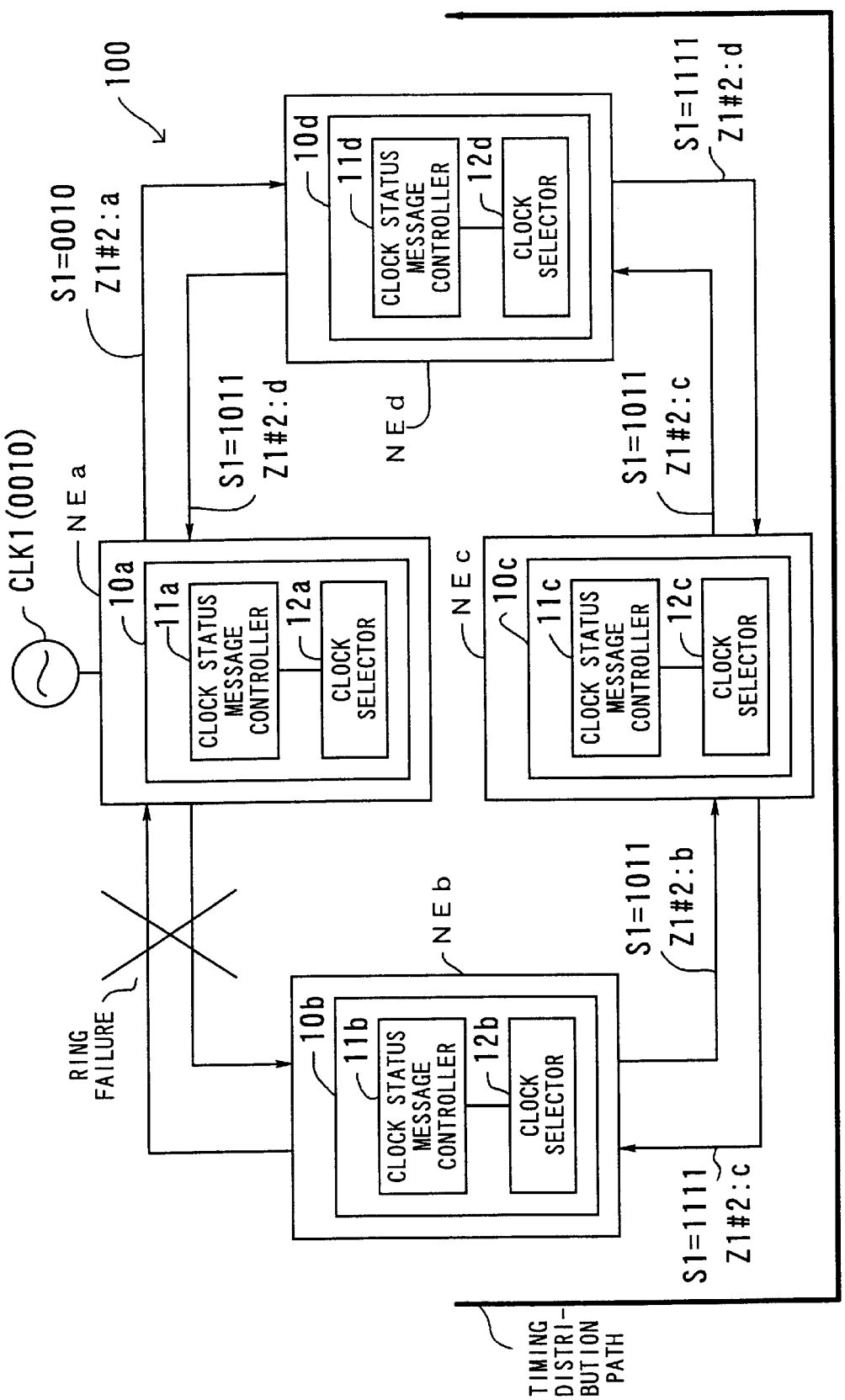

Referring to FIG. 4, it is now assumed that a ring failure has occurred at some point between NEa and NEb. This breaks the current timing distribution path, making it impossible for NEb to receive the reference clock signal CLK1 from NEa. The clock selector 12b in NEb, however, cannot use an alternative clock signal from NEc, because it has been receiving, a DUS message (S1=1111, Z1#2:c) from NEc. The network element NEb then enters holdover mode, outputting its local clock signal, or holdover clock signal, to the downstream network element NEc. As explained in FIG. 2, the quality level of this holdover clock is "1011" (G.813 SETS), and therefore, the clock status message controller 11b in NEb sends updated clock quality data "S1=1011" to NEc, together with synchronization control data "Z1#2:b."

The clock selector 12c in NEc selects an appropriate clock source on the basis of the received clock status messages; that is, it compares (S1=1011, Z1#2:b) received from NEb with (S1=1111, Z1#2:d) received from NEd. This comparison causes the clock selector 12c to choose the holdover clock of NEb as its reference timing signal, and accordingly, the clock status message controller 11c in NEc sends (S1=1011, Z1#2:c) to the downstream network element NEd. In a similar way, the clock selector 12d in NEd chooses the clock signal supplied from NEc, and its local clock status message controller 11d sends a message (S1=1011, Z1#2:d) to the next network element NEa. At this stage, the reference clock signal with a quality level "1011" is delivered over a timing distribution path of "NEb→NEc→NEd," whereas the master network element NEa continues working with the reference clock signal CLK1.

Figure 5:
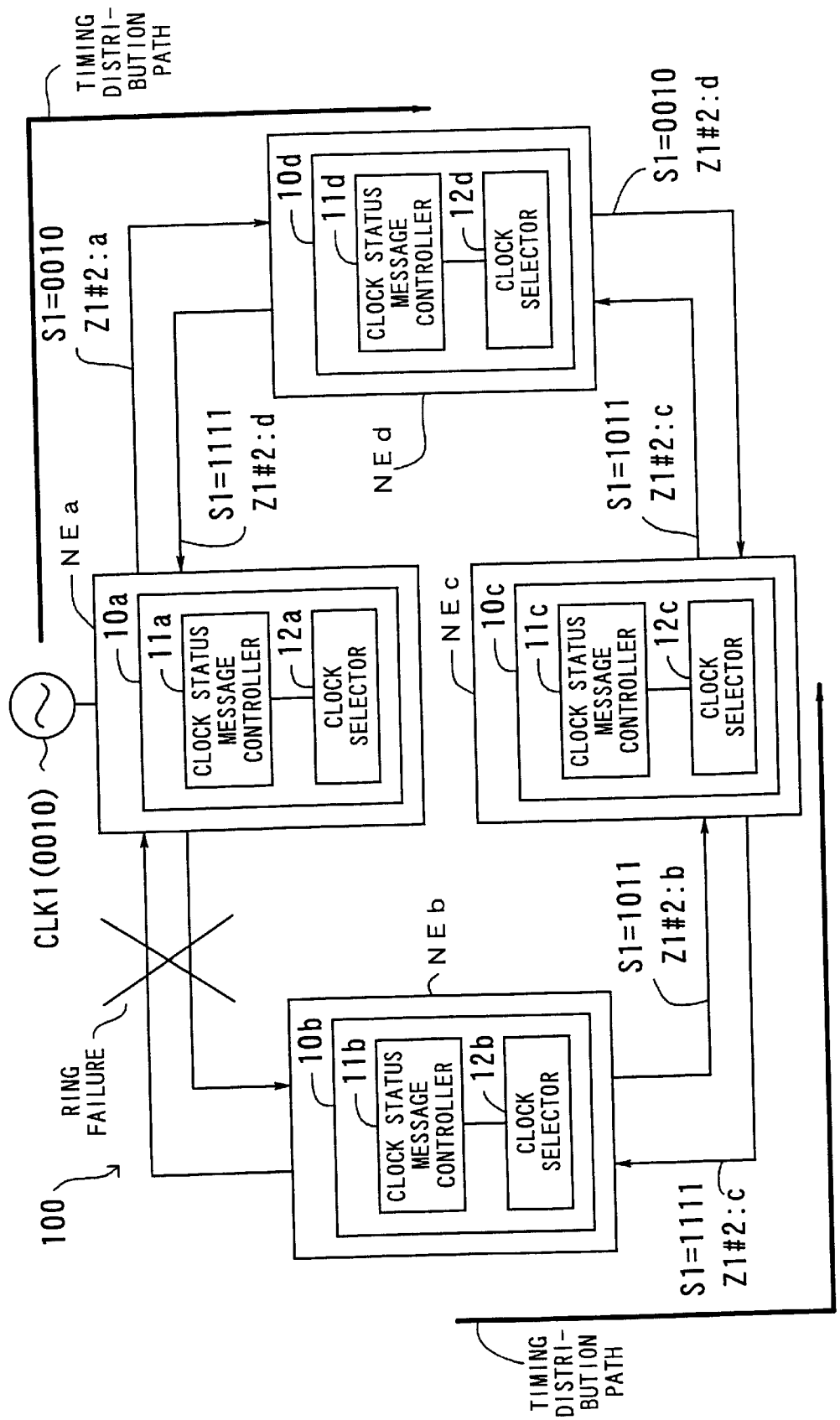

Referring next to FIG. 5, the operation at the next stage will be described below. Since the clock quality status has changed, the clock selector 12d in NEd attempts to choose again the most appropriate reference timing source, comparing (S1=1011, Z1#2:c) received from NEc with (S1=0010, Z1#2:a) received from NEa. Since "0010" indicates a higher quality than "1011," the clock selector 12d chooses a clock signal supplied from the network element NEa. The clock status message controller 11d in NEd then transmits a message (S1=0010, Z1#2:d) to NEc. This produces a situation where two different reference clock signals are used within the same SDH network 100 temporarily: one with a lower quality level of "1011" distributed from NEb to NEc, and another with a higher quality level of "0010" distributed from NEa to NEd. Note that the latter signal derives from the primary reference clock CLK1.

Figure 6:
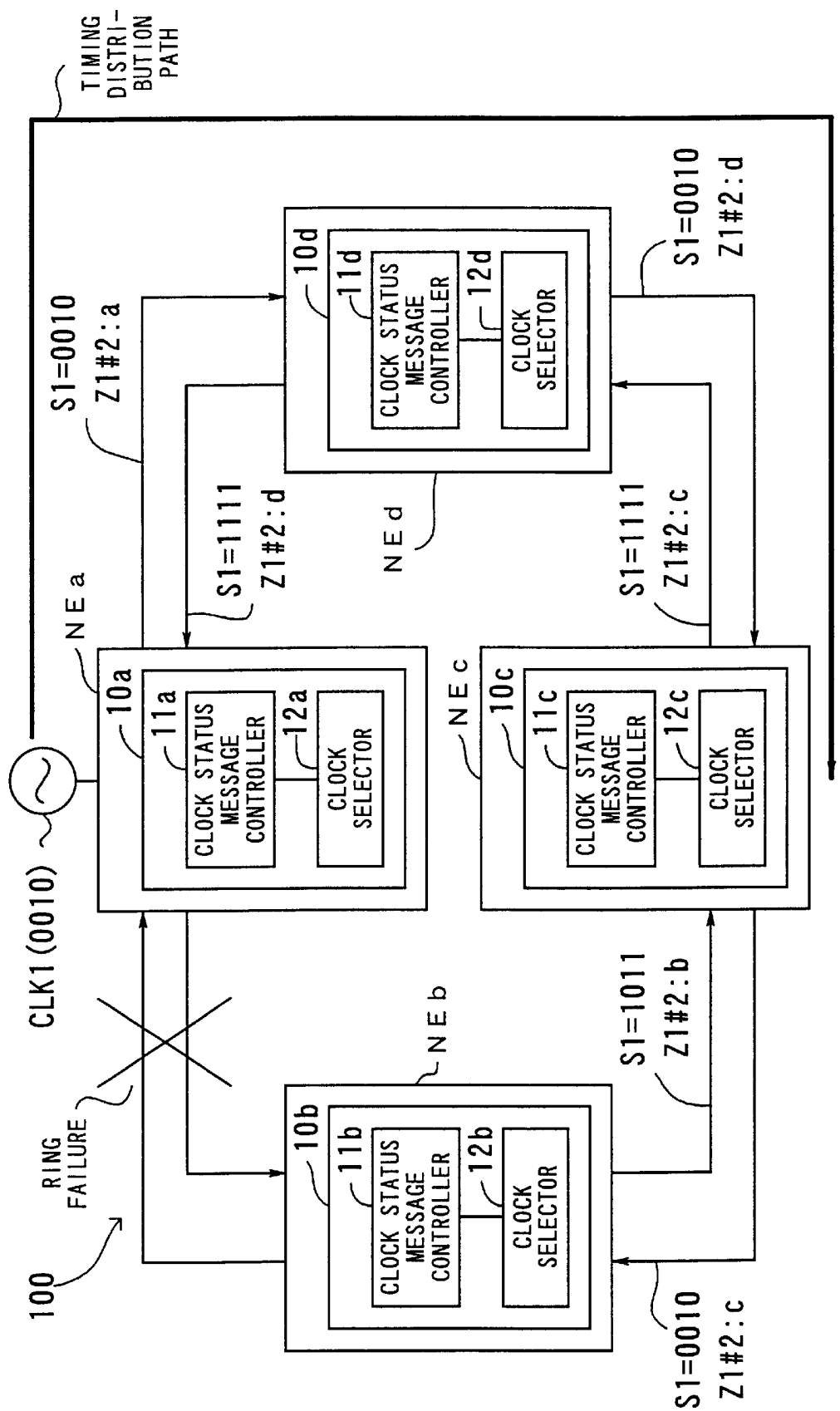

Referring now to FIG. 6, the operation at the next stage will be described below. Since the situation has changed again, the clock selector 12c in NEc attempts to choose the most appropriate reference timing source, based on the received clock status messages. That is, it compares (S1=0010, Z1#2:d) received from NEd with (S1=1011, Z1#2:b) received from NEb. As "0010" indicates a higher quality than "1011," the clock selector 12c now chooses the clock signal being supplied from NEd. The clock status message controller 11c then transmits a message (S1=0010, Z1#2:c) to NEb, as well as sending a DUS message (S1=1111, Z1#2:c) back to NEd. The timing distribution path (NEa→NEd→NEc) is formed for the reference clock signal "0010" at this stage.

Figure 7:
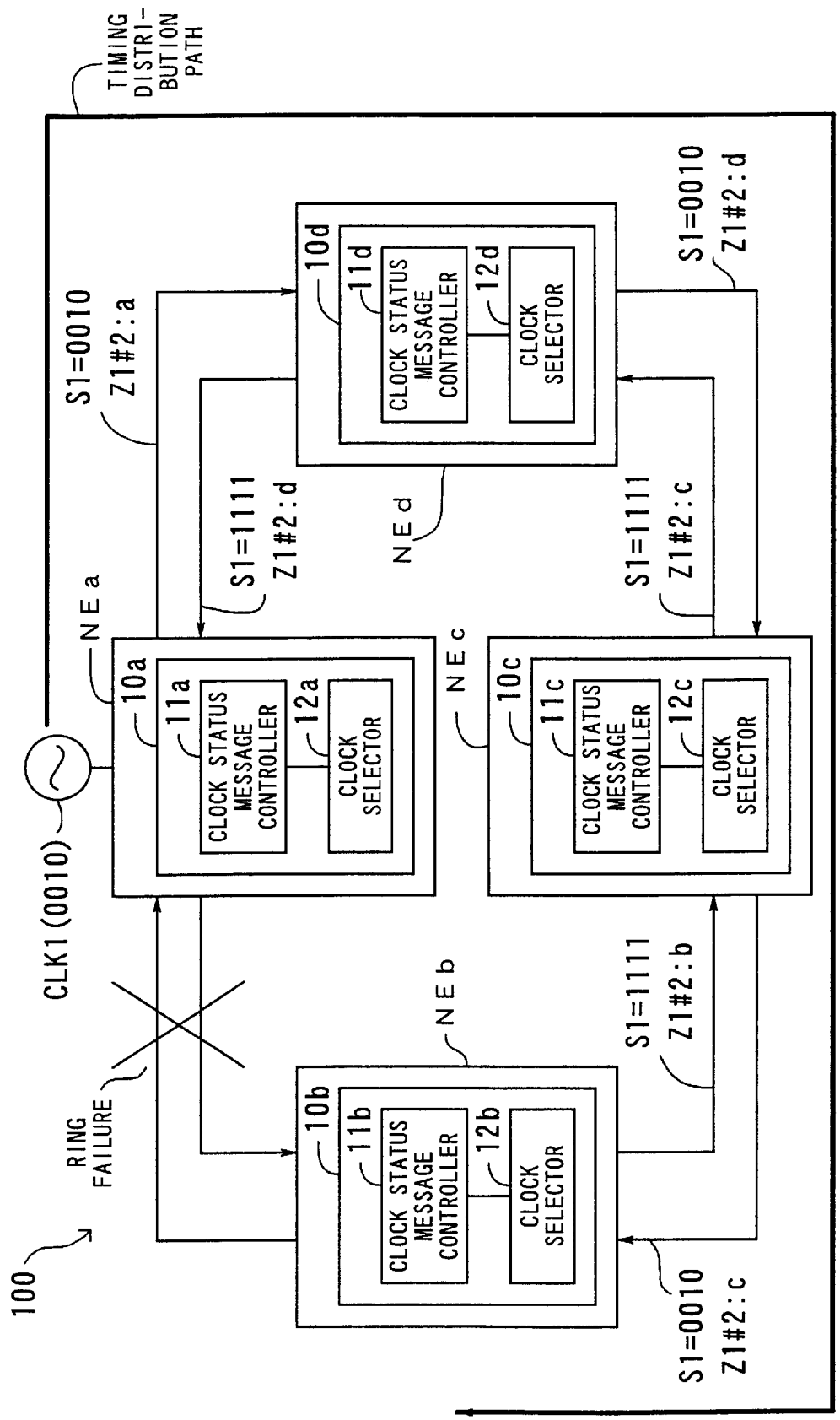

FIG. 7 depicts the final stage in the present problem situation. Since a new clock status message (S1=0010, Z1#2:c) from NEc is received, the clock selector 12b in NEb attempts to choose again the most appropriate reference timing source, comparing its local holdover clock signal with the clock signal from NEc in terms of quality levels. Because "0010" indicates a higher quality than "1011," the clock selector 12b chooses the clock signal supplied from NEc, and accordingly, the clock status message controller 11b in NEb sends a DUS message (S1=1111, Z1#2:b) to NEc. Finally, the timing distribution path of CLK1 with a quality level of "0010" is established as shown in FIG. 7 (i.e., NEa→NEd→NEc→NEb).

As described above, the clock selectors 12a to 12d selects a clock signal with the highest quality level from among those available at each network element, and the selected clock signal is forwarded to its neighboring network elements, i.e., to the source network element and the next downstream network element. According to the present invention, the network synchronization controllers 10a to 10d are each configured to transmit clock quality data and synchronization control data to the downstream network element, while sending a DUS message to the source network element. Being carried by the second Z1 byte Z1#2, the synchronization control data identifies the sending network element, thus allowing the receiving network elements to distinguish the sender from others easily. The proposed mechanism prevents a timing loop from occurring and thus permits the network to smoothly establish synchronization. The above example has assumed a quite simple ring network with only four network elements. Many real-world systems, however, have much more complex structure, where one network element may actually be linked to two or more network elements. By sending not only clock quality data, but also synchronization control data to identify the sending network element, the present invention makes it possible for each network element to distinguish the available clock sources from inappropriate clock sources in a more efficient manner. Although the first embodiment uses Z1#2 as the vehicle for network element identifiers, it is not intended to limit the invention to that specific construction. Potentially, other undefined portions of SDH overhead can be used for the same purpose.

The next section will now describe a second embodiment of the present invention. Recall the SDH network 100 of the first embodiment, in which each network element sends a DUS message "S1=1111" to its neighboring network element when it has selected a clock signal supplied therefrom. Referring again to FIG. 3, for instance, the network element NEb selects a clock signal from NEa and thus sends a DUS message (S1=1111, Z1#2:b) to NEa. Similarly, the next network element NEc sends (S1=1111, Z1#2:c) to its clock source NEb, and NEd sends (S1=1111, Z1#2:d) to its clock source NEc. Notice that the last network element NEd sends (S1=0010, Z1#2:d) to NEa, because it does not use the clock signal that is directly supplied from NEa. This situation, however, is potentially problematic because it could create a timing loop if the network element NEa happened to choose a clock signal of "0010" supplied from NEd, instead of using the original clock signal CLK1 supplied from the reference timing source. In this case, the entire ring of network elements NEa to NEd would fall into an undesired timing loop condition. The second embodiment solves this problem by configuring NEd to send a DUS message "S1=1111" to NEa.

Figure 8:
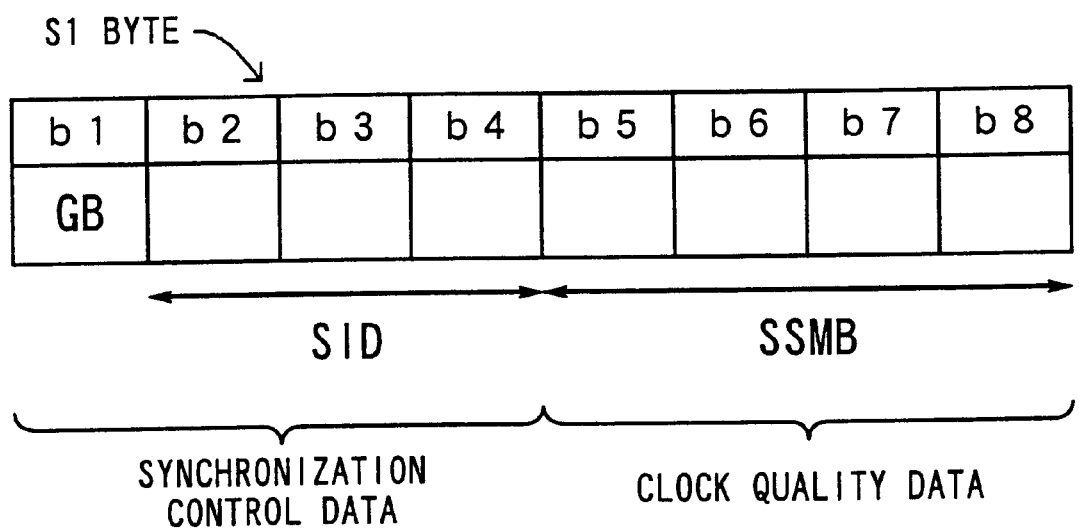
FIG. 8 is a diagram which shows the bit assignment of S1 byte that is used as part of a clock status message in a second embodiment of the present invention.

FIG. 8 shows the bit assignment of S1 byte that is used as part of a clock status message in the second embodiment of the present invention. Recall that the upper four bits of S1 byte are currently undefined. In the second embodiment, the most significant bit b1 of S1 byte is allocated to a flag named "GB" that indicates whether the network element of interest is a master network element. Further, bits b2 to b4 are used to carry a timing source identifier (SID). These additional flag and identifier are collectively referred to as the synchronization control data in the second embodiment.

The network element NEa operates as a master network element coupled to a clock circuit CLK1 which provides primary reference timings for the SDH network 100. In the rest of this description, such a special network element will be called a "general network element" (GNE). The above GB flag relates to the distinction of GNE. That is, "GB=1" indicates that the network element serves as a GNE, while "GB=0" means that it is an ordinary network element, or slave network element. The clock source CLK1 has an identifier (SID) of "001."

The clock status message controller 11a in NEa sets the GB flag to "1" since NEa acts as a GNE, thus sending "GB=1" and "SID=001" to its neighboring network elements NEb and NEd. The clock status message controller 11b in NEb then sends "GB=0" and "SID=001" to NEa and NEc. The clock status message controller 11c in NEc sends the same to NEb and NEd, and the clock status message controller 11d in NEd sends the same to NEc and NEa. From the information "GB=1" in the received message, NEb and NEd recognize that the sender (i.e., NEa) is a GNE. Since the clock selector 12d in NEd is selecting a clock signal CLK1 with SID=001, its local clock status message controller 11d transmits a DUS message "S1=1111" to NEa. While NEd supplies a clock signal with a quality level of "0010," the DUS message does not allow the NEa to select the clock signal being supplied, and thus prevents the entire ring network of NEa to NEd from forming a timing loop. Regarding another clock signal that NEa receives from NEb, NEa disregards it since NEb sends a DUS message "1111" to NEa as in the first embodiment.

Figure 9:
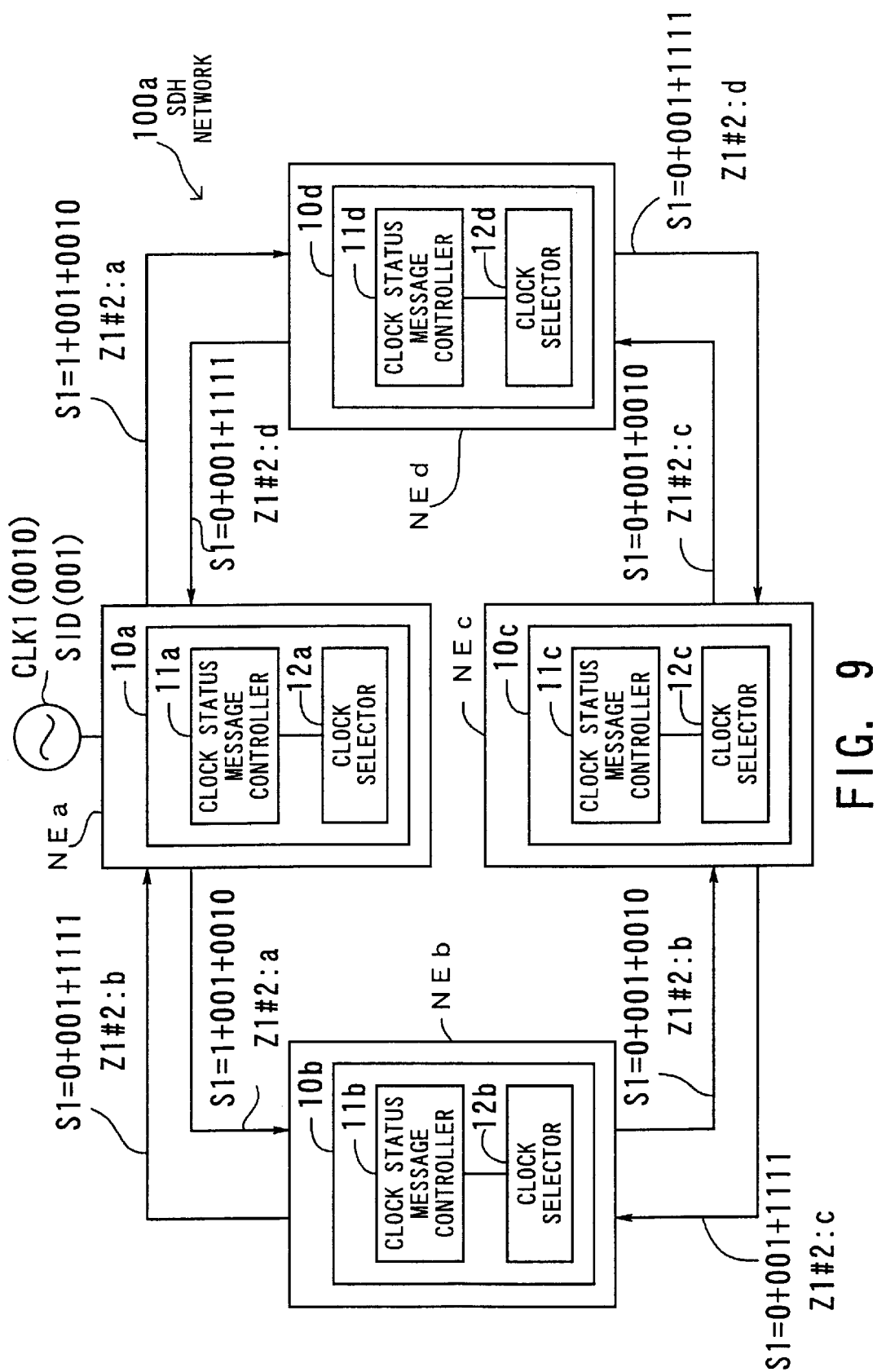
FIG. 9 is a diagram which shows an SDH network according to the second embodiment.

FIG. 9 shows an SDH network 10a according to the second embodiment of the present invention. In this network 100a, four network elements NEa to NEd are connected in a dual ring topology, comprising network synchronization controllers 10a to 10d, respectively.

Here, the clock status message controller 11a in the network element NEa sends a clock status message (S1=1+ 001+0010, Z1#2:a) to its neighboring network elements NEb and NEd. The clock status message controller 11b in NEb sends (S1=0+001+0010, Z1#2:b) to NEc, and (S1=0+ 001+1111, Z1#2:b) to NEa. Likewise, the clock status message controller 11c in NEc sends (S1=0+001+0010, Z1#2:c) to NEd, and (S1=0+001+1111, Z1#2:c) to NEb. The clock status message controller 11d in NEd sends (S1=0+001+ 1111, Z1#2:d) to NEc, and (S1=0+001+1111, Z1#2:d) to NEa. In the second embodiment, the network element NEd is configured to send a DUS message to the network element NEa that is serving as a GNE. This configuration prevents the ring network of NEa to NEd from falling into a timing loop.

FIG. 9 also shows that the timing source identifier SID that NEa has added to its clock status message travels along the ring and finally returns to NEa. This allows the network element NEa to recognize itself as the GNE. When a clock status message having such an identical SID is received, the clock selector 12a of NEa (GNE) will withdraw the sending network element NEd from candidate clock sources. This algorithm improves the reliability of the synchronization distribution mechanism of the present invention, preventing the ring network of NEa to NEd from forming a timing loop.

The above-described second embodiment has proposed that the GB flag and SID are assigned respectively to bit b1 and bits b2–b4 of S1 byte, allowing up to six GNEs to be deployed in a single network for redundancy design.

However, the implementation of synchronization control data is not limited to this specific bit assignment of S1 byte. It also goes without saying that other undefined portion of SDH overhead may be used to offer the same or extended functions.

The next section will now describe a third embodiment of the present invention. This third embodiment differs from the preceding second embodiment in that the third Z1 byte (Z1#3) of SDH overhead is used to transport GNE identification data, instead of allocating S1 byte for timing source identifiers (SID).

Figure 10:
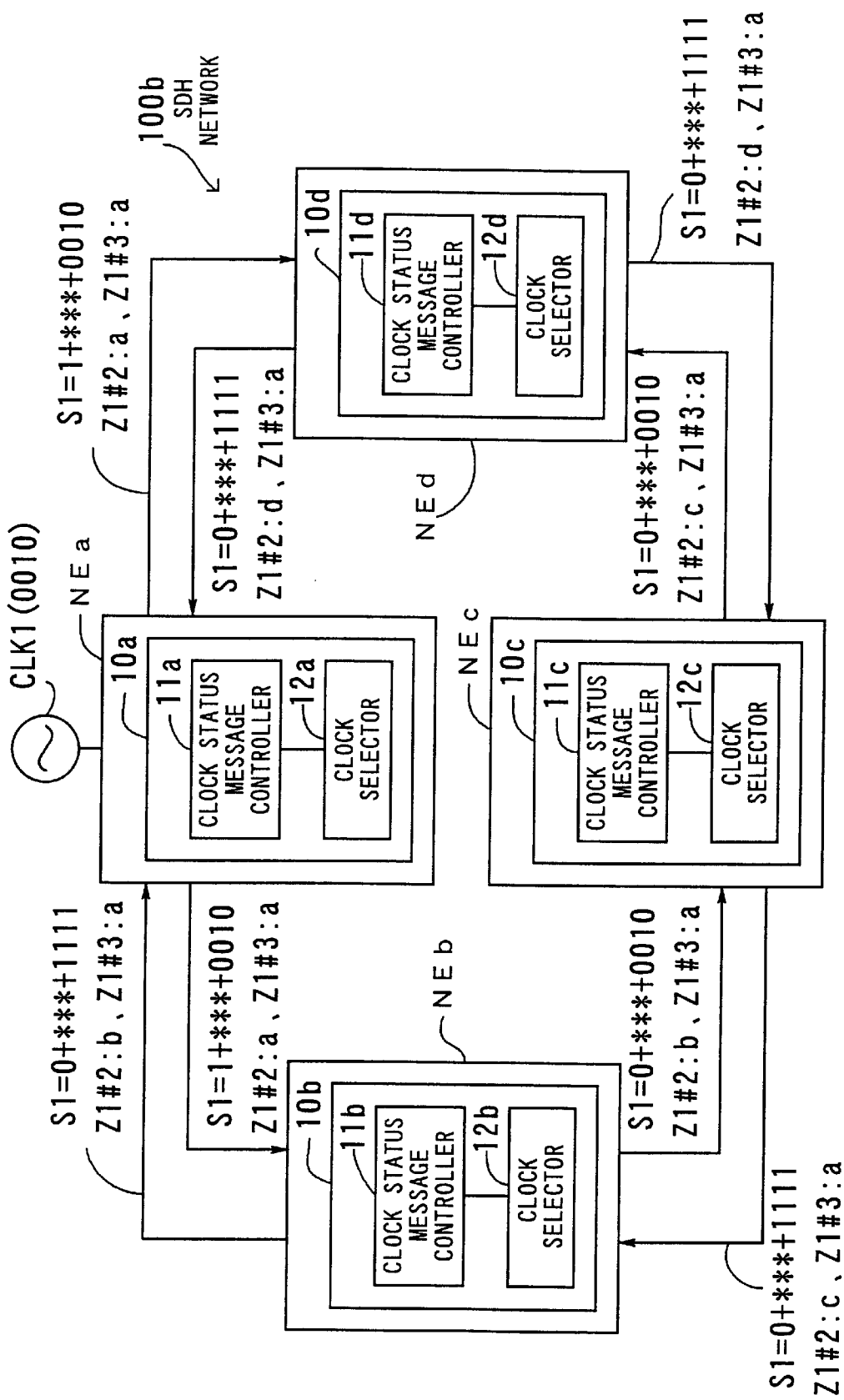
FIG. 10 is a diagram which shows an SDH network according to a third embodiment of the present invention.

FIG. 10 shows an SDH network 100b according to the third embodiment of the present invention, in which four network elements NEa to NEd are connected in a dual ring topology, comprising network synchronization controllers 10a to 10d, respectively.

Here, the clock status message controller 11a in the network element NEa sends a clock status message (S1=1+*+0010, Z1#2:a, Z1#3:a) to its neighboring network elements NEb and NEd, where the asterisks "*" indicate "don't care" bits. The clock status message controller 11b in NEb sends (S1=0+*+0010, Z1#2:b, Z1#3:a) to NEc, and (S1=0+*+1111, Z1#2:b, Z1#3:a) to NEa. The clock status message controller 11c in NEc sends (S1=0+*+0010, Z1#2:c, Z1#3:a) to NEd, and (S1=0+*+1111, Z1#2:c, Z1#3:a) to NEb. The clock status message controller 11d in NEd sends (S1=0+*+1111, Z1#2:d, Z1#3:a) to NEc, and (S1=0+*+1111, Z1#2:d, Z1#3:a) to NEa.

As such, the third embodiment of the present invention is configured to use Z1#3 to transport GNE identification data, instead of sending SID. This configuration prevents the ring network of NEa to NEd from forming a timing loop. As an alternative, the third embodiment may be slightly modified in such a way that S1 byte and Z1#3 byte be fully used to transport both SID and GNE identification data, meaning that the neighboring network elements can identify not only the GNE in use, but also the clock source coupled to the GNE.

The following section will now describe a network synchronization management station according to the present invention. This network synchronization management station collects clock status messages flowing over the SDH network and performs necessary management tasks to maintain the synchronized operation of the whole network.

Figure 11:
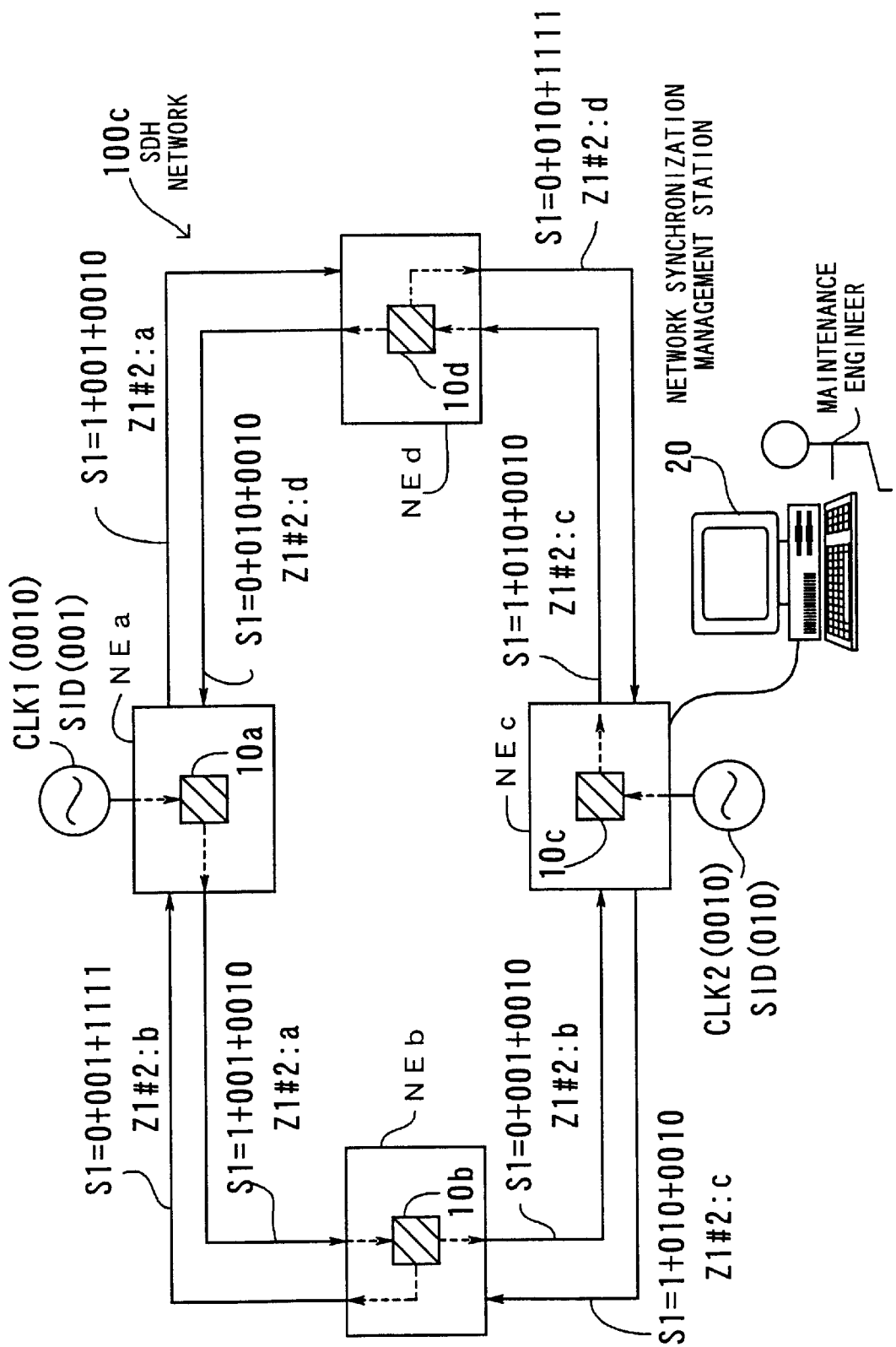
FIG. 11 is a diagram which shows an SDH network with a network synchronization management station.

FIG. 11 shows a typical SDH network with a network synchronization management station. This SDH network 100c is a dual ring network, in which four network elements NEa to NEd are linked in a serial fashion. They are equipped with network synchronization controller 10a to 10d, respectively, to control the local timing system of each network element. A network synchronization management station 20 is coupled to one of the network elements (e.g., NEc) to manage the synchronized operation of the SDH network 100c. Sitting at the station 20, a maintenance engineer performs monitoring, reconfiguring, and other maintenance activities related to the SDH network 100c.

The network elements NEa and NEc have clock sources CLK1 and CLK2 to provide the SDH network 100c with a consistent reference timing signal. CLK1 and CLK2 are both rated "0010" (G.811 PRS) and assigned unique timing source identifiers (SIDs) "001" and "010," respectively. FIG. 11 depicts a situation where NEa uses CLK1 as the reference timing signal, whereas NEc uses CLK2. NEb chooses the former clock signal supplied from NEa, and NEd selects the latter clock signal supplied from NEc.

In such a situation, the clock status message controller 11a in NEa sends a clock status message (S1=1+001+0010, Z1#2:a) to NEb and NEd. The clock status message controller 11b in NEb then sends (S1=0+001+0010, Z1#2:b) to NEc, and (S1=0+001+1111, Z1#2:b) to NEa. The clock status message controller 11c in NEc, on the other hand, sends a message (S1=1+010+0010, Z1#2:c) to NEd, and (S1=1+010+0010, Z1#2:c) to NEb. The clock status message controller 11d in NEd thus sends (S1=0+010+1111, Z1#2:d) to NEc, and (S1=0+010+0010, Z1#2:d) to NEa.

As FIG. 11 shows, there are two GNEs in the single SDH network 100c, and clock status messages clearly indicate which network element is synchronized with which GNE. By collecting such clock status messages, the network synchronization management station 20 can easily keep track of synchronization status of the SDH network 100c.

The following section will now describe the internal structure of the proposed network synchronization controller.

Figure 12:
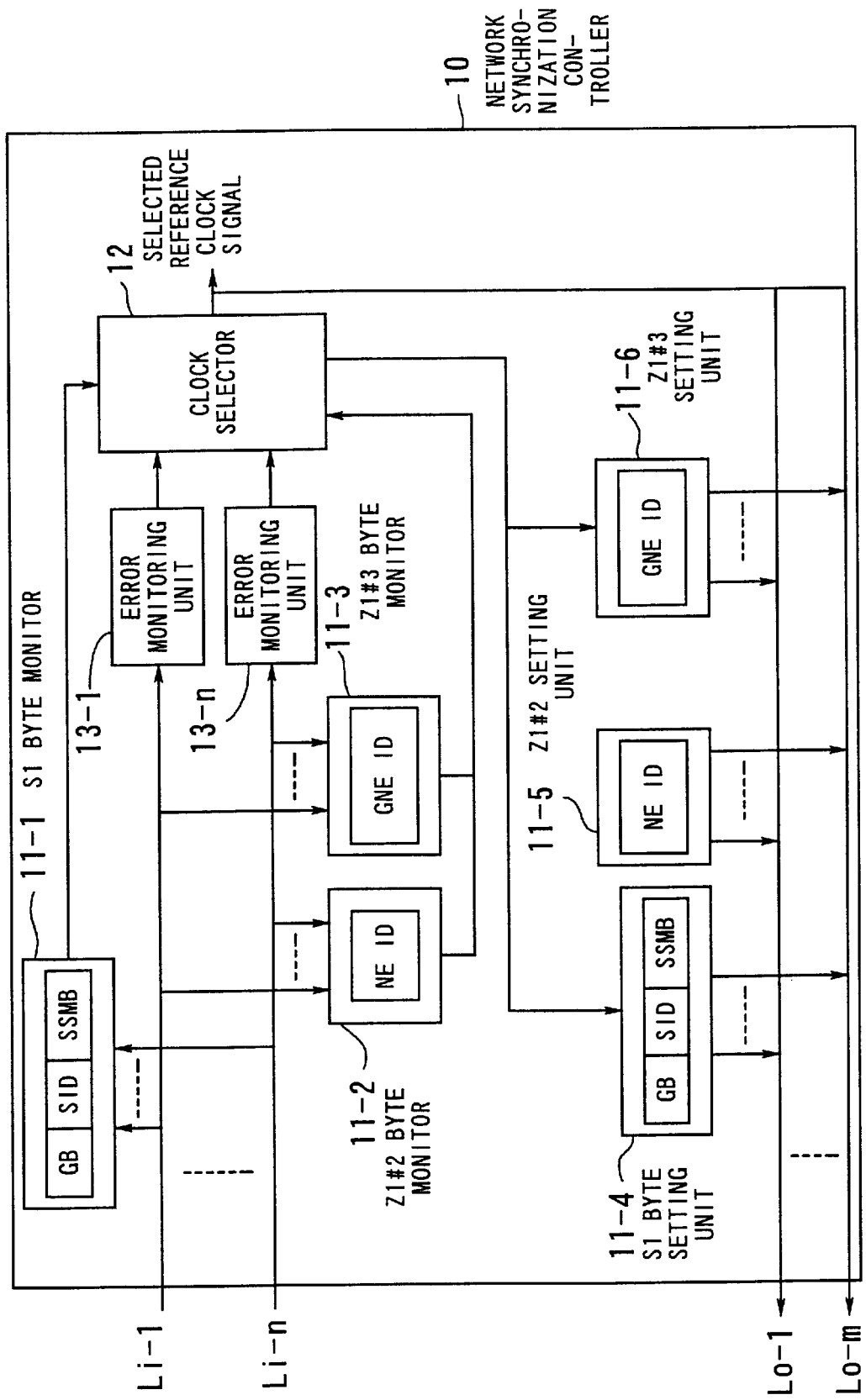
FIG. 12 is a block diagram of a network synchronization controller.

FIG. 12 is an internal block diagram of a network synchronization controller 10, which has n input lines Li-1 to Li-n and m output lines to link with other network elements. Error monitoring units 13-1 to 13-n monitor incoming clock signals on the input lines Li-1 to Li-n to detect any problem with them. When a problem occurs to one of those clock signals, the error monitoring units 13-1 to 13-n disables the transmission signal from entering the clock selector 12.

A clock status message controller 11 monitors incoming clock status messages received over the input lines Li-1 to Li-n, besides producing and transmitting clock status messages over the output lines Lo-1 to Lo-m. Message monitoring functions of the clock status message controller 11 are implemented as an S1 byte monitor 11-1, a Z1#2 byte monitor 11-2, and a Z1#3 byte monitor 11-3. On the other hand, its message producing functions are implemented as an S1 byte setting unit 11-4, a Z1#2 byte setting unit 11-5, and a Z1#3 byte setting unit 11-6.

The S1 byte monitor 11-1 monitors clock status messages, each of which comprises synchronization control data (i.e., GB flag and SID) and clock quality data (i.e., SSMB), and sends them to the clock selector 12. The Z1#2 byte monitor 11-2 watches network element identifiers carried by Z1#2 byte over n input lines Li-1 to Li-n, and supplies them to the clock selector 12. The Z1#3 byte monitor 11-3 keeps track of GNE identifiers on each input line. If the network element is a GNE and recognizes the captured GNE identifier as its own, the Z1#3 byte monitor 11-3 commands the clock selector 12 not to select the corresponding line clock signal. Based on the above information, the clock selector 12 chooses the most appropriate clock signal from among those available at the network element.

To describe the clock signal selected by the clock selector 12, the S1 byte setting unit prepares a clock status message in S1 byte, which contains synchronization control data (GB flag and SID) and clock quality data (SSMB). The Z1#2 byte setting unit 11-2 sets the identifier of the network element to Z1#2 byte. To provide more about the clock signal selected by the clock selector 12, the Z1#3 byte setting unit 11-3 sets to Z1#3 byte the identifier of a GNE being activated.

Figure 13:
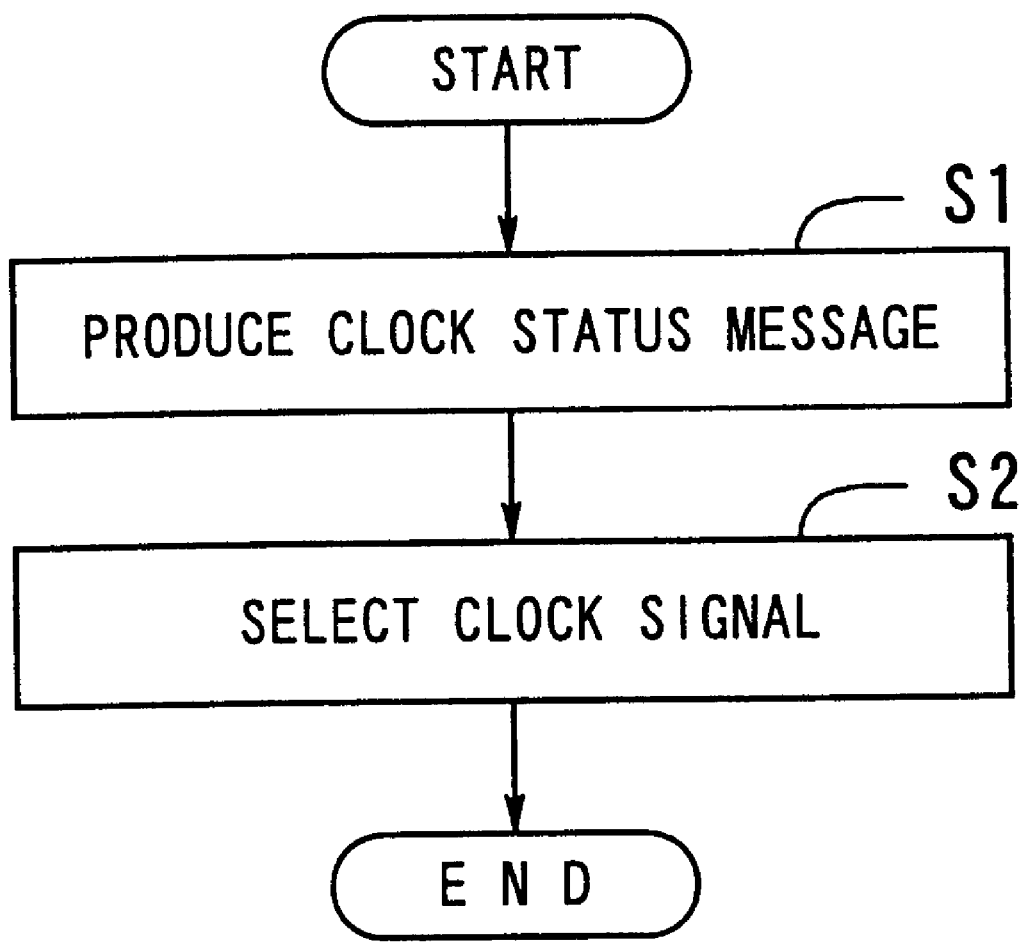
FIG. 13 is a flowchart which shows a process to prevent the occurrence of a timing loop.
Figure 14:
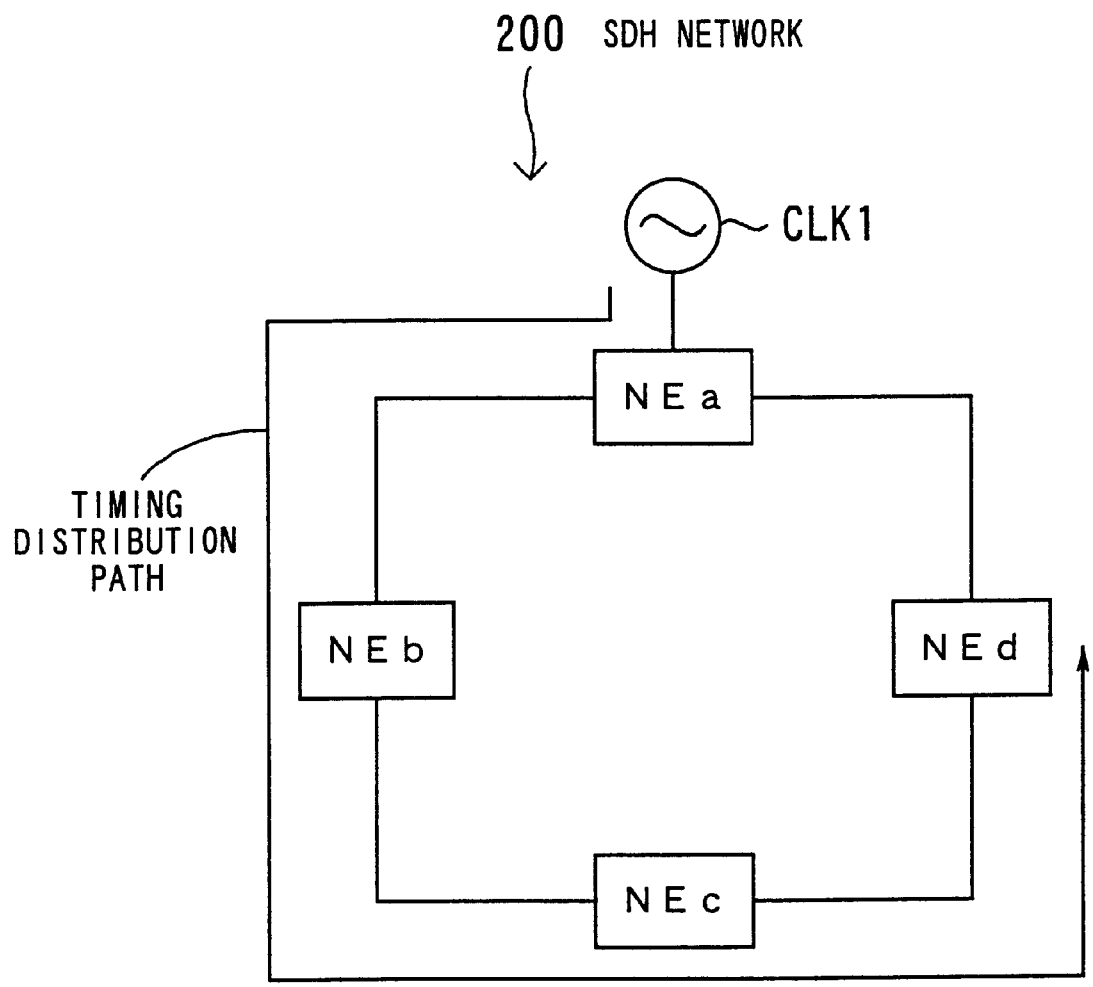
FIG. 14 is a diagram which shows clock timing distribution in a conventional SDH network.
Figure 15:
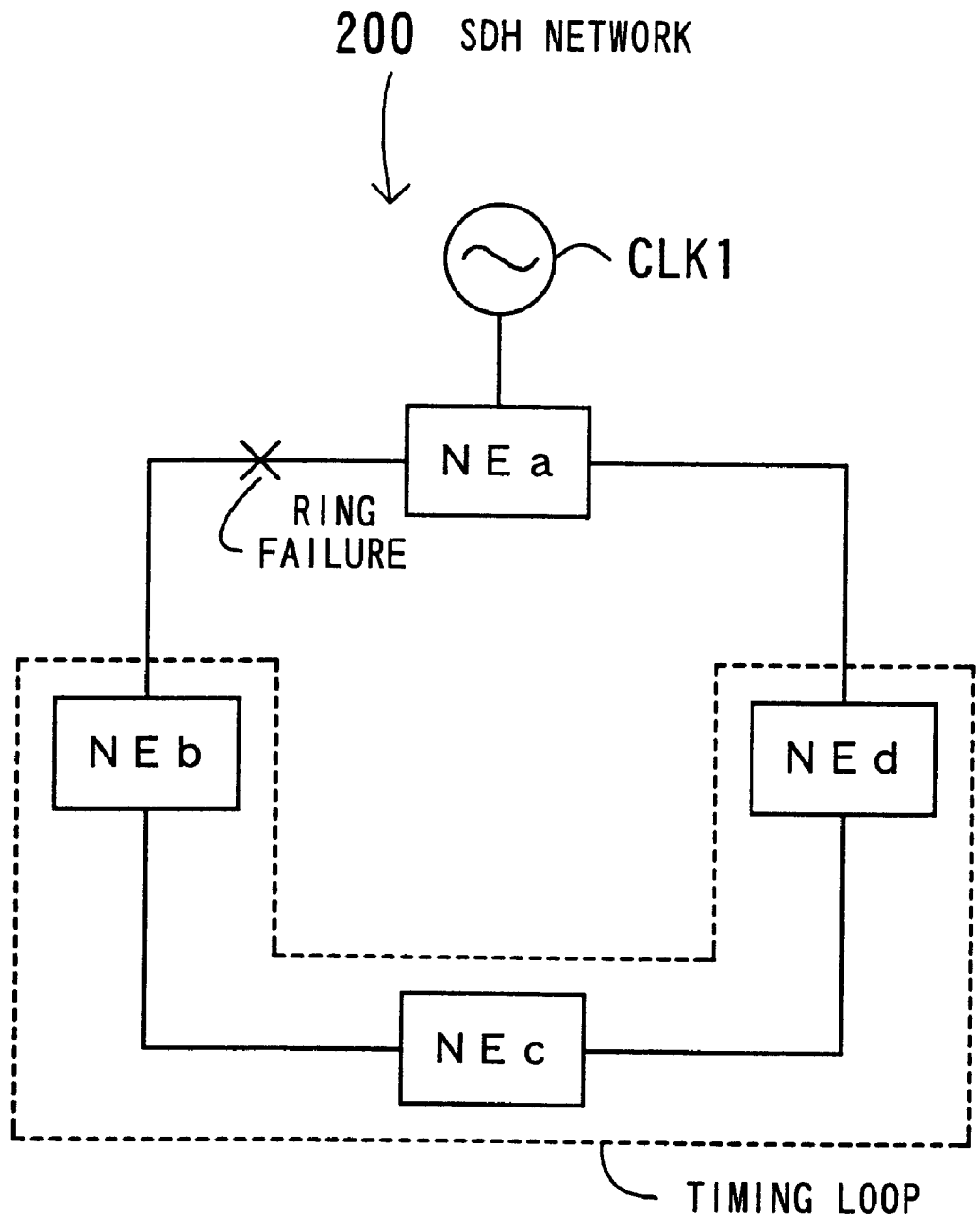
FIG. 15 is a diagram which shows an example of a timing loop that occurs in the conventional SDH network.

Referring next to FIG. 13, a timing loop prevention method of the present invention will be described below. This method comprises the following steps:

(S1) Producing and sending a clock status message which is composed of clock quality data indicating the quality level of an outgoing clock signal, and synchronization control data for establishing network synchronization.

(S2) Selecting an appropriate reference timing source for synchronization, based on the received clock status message.

The present invention proposes several different implementations regarding the synchronization control data. More specifically, it may include an identifier to distinguish the sending network element from others. The clock quality data, on the other hand, describes the quality level of a reference timing source that the network element has selected. When forwarding the selected reference timing signal to the next network element, it also sends the corresponding clock quality data to the destination, together with appropriate synchronization control data. Further, the network element issues a DUS (Don't Use for Synchronization) message in the opposite direction, thereby inhibiting the preceding network element from choosing the reference timing signal. This synchronization messaging method effectively prevents the occurrence of a timing loop and smoothly establishes network synchronization, as in the first embodiment described earlier.

According to another implementation, the synchronization control data further includes a flag indicating that the sending network element is a master network element having a consistent reference timing source for the network. The master network element sets this flag and sends it to slave network elements, along with the identifier of the reference timing source. The message including such a flag and timing source identifier causes the receiving slave network element to send a DUS message back to the master network element, if it has selected the reference clock signal for synchronization. While the master network element may receive a clock signal from the slave network element, the DUS message inhibits the use of that clock signal. This usage of DUS messages can be seen, for example, in the second embodiment of the present invention described earlier, where the slave network element NEd sends a DUS message to the master network element NEa to prevent the entire network from falling into a timing loop condition (see FIG. 9).

The timing source identifier transmitted by the master network element as part of synchronization control data would return to the sender after circulating through the ring network. The master network element can detect it because the received timing source identifier coincides with what it has originally sent. Recall the second embodiment, for example, in which the network element NEa serving as a GNE receives the identifier of its reference timing source CLK1 from another network element NEd, thus recognizing itself as a GNE. The network element NEa is designed to neglect the line clock signal from NEd in such a case. As seen from this example, the use of timing source identifiers prevents the entire network from forming a timing loop.

According to still another implementation of the proposed method, the synchronization control data includes the identifier of a master network element having a reference timing source for network synchronization. The master network element compares each received identifier with its own identifier, and if they match with each other, the master network element disregards the clock signal that is supplied from the sending slave network element. The third embodiment of the present invention uses this method, in which GNE identification data is finally returned to the master network element NEa, allowing the NEa to consider itself as the active GNE. In this example, NEa will not choose a line clock signal from NEd, thus preventing the entire network from falling into a timing loop condition.

Clock status messages, each composed of the above-described synchronization control data and clock quality data, provide sufficient information for synchronization management of a network. The present invention proposes a network synchronization management station which is designed to collect such clock status messages exchanged between network elements and use them for management purposes.

The above discussion will now be summarized as follows. The present invention provides a network synchronization controller and timing loop prevention method which use clock status messages to allow the network elements to establish timing synchronization correctly and efficiently. Here, each clock status message contains identifiers of network elements concerned and a reference timing source being used, in addition to the information on the quality of the source. The network elements choose the most appropriate reference timing source, based on the clock status messages sent from their neighboring network elements. With such synchronization messaging mechanisms, the proposed controller and method enable network elements to establish synchronization, preventing the occurrence of an unwanted timing loop.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network synchronization controller which controls a process of establishing timing synchronization within a network, comprising:

clock status messaging means, disposed in each network element on the network, for producing and sending a clock status message composed, of clock quality data and synchronization control data, the clock quality data indicating a quality level of a clock signal that said each network element supplies to neighboring network elements thereof, the synchronization control data including information to be used to make the network synchronized with a single reference timing source; and clock selection means, disposed in said each network element, for selecting one of clock signals that said each network element receives from the neighboring network elements, based on the clock status messages received along with the clock signals.

2. The network synchronization controller according to claim 1, wherein:

said each network element has a network element identifier pre-assigned thereto; and said clock status messaging means produces and sends the synchronization control data including the network element identifier of said each network element.

3. The network synchronization controller according to claim 1, wherein:

the clock quality data includes, as one possible option, a "Don't Use for Synchronization (DUS)" message that will inhibit a receiving network element from choosing a clock signal being supplied from a sending network element; and said clock status messaging means sends the DUS message to such a network element that supplies the clock signal selected by said clock selection means.

4. The network synchronization controller according to claim 1, wherein:

said each network element includes a master network element having a reference clock that serves as the single reference timing source in the network;

the reference clock has a timing source identifier pre-assigned thereto; and said clock status messaging means disposed in the master network element sends to the neighboring network elements the synchronization control data including:

a flag indicating that sending network element serves as the master network element, and the timing source identifier of the reference clock.

5. The network synchronization controller according to claim 4, wherein:

the neighboring network elements receive from the master network element the synchronization control data including the flag and timing source identifier; and the clock quality data includes, as one possible option, a "Don't Use for Synchronization (DUS)" message that will inhibit a receiving network element from choosing a clock signal being supplied from the sending network element; and said clock status messaging means in a neighboring network element returns the DUS message to the master network element, if said clock selection means in the neighboring network element has selected the clock signal deriving from the reference clock in the master network element.

6. The network synchronization controller according to claim 1, wherein:

the single timing source has a timing source identifier pre-assigned thereto; and said clock status messaging means sends the synchronization control data including the timing source identifier of the single timing source to the neighboring network elements.

7. The network synchronization controller according to claim 6, wherein:

said each network element includes a master network element having a reference clock that serves as the single reference timing source in the network; and said clock selection means disposed in the master network element will disregard the clock signal supplied from a neighboring network element, if the timing source identifier received therefrom coincides with that of the reference clock of the master network element.

8. The network synchronization controller according to claim 1, wherein:

said each network element includes a master network element having a reference clock that serves as the single reference timing source in the network;

said each network element has a network element identifier pre-assigned thereto; and said clock status messaging means disposed in the master network element sends to the neighboring network elements the synchronization control data including the network element identifier of the master network element.

9. The network synchronization controller according to claim 8, wherein said clock selection means disposed in the master network element will disregard the clock signal supplied from a neighboring network element, if the network element identifier received therefrom coincides with the network element identifier of the master network element.

10. The network synchronization controller according to claim 1, further comprising a network synchronization management station which collects a clock status messages and manages synchronization status of an entire network, based on the collected clock status messages.

11. A method of preventing a network from forming a timing loop, comprising:

(a) producing a clock status message composed of clock quality data and synchronization control data and sending the clock status message, together with a clock signal being selected, from each network element to a neighboring network element thereof, the clock quality data indicating a quality level of the clock signal, the synchronization control data including information to be used to establish network synchronization; and (b) selecting one of a plurality of clock signals received from other network elements, based on clock status messages received along with the clock signals.

12. The method according to claim 11, wherein:

said each network element has a network element identifier pre-assigned thereto; ;and said step (a) of producing and sending the clock status message includes producing and sending the synchronization control data including the network element identifier assigned to said each network element.

13. The method according to claim 11, wherein:

the clock quality data; includes, as one possible option, a "Don't Use for Synchronization (DUS)" message that will inhibit a receiving network element from choosing a clock signal being supplied from a sending network element; and said step (a) of producing and sending the clock status message includes sending the DUS message to such a network element that supplies the clock signal being selected at said step (b).

14. The method according to claim 11, wherein:

said each network element includes a master network element having a reference clock that serves as a single reference timing source in the network;

the reference clock has a timing source identifier pre-assigned thereto; and said step (a) of producing and sending the clock status message includes sending the synchronization control data from the master network element to neighboring network elements thereof, the synchronization control data including: a flag indicating that a sending network element serves as the master network element, and the timing source identifier of the reference clock.

15. The method according to claim 14, wherein:

the clock quality data includes, as one possible option, a "Don't Use for Synchronization (DUS)" message that will inhibit a receiving network element from choosing a clock signal being supplied from the sending network element; and said step (a) of producing and sending the clock status message includes sending the DUS message to the master network element, when the synchronization control data including the flag and timing source identifier is received, and when the clock signal deriving from the reference clock in the master network element is selected.

16. The method according to claim 11, wherein:

a single timing source has a timing source identifier pre-assigned thereto; and said step (a) of producing and sending the clock status message includes sending to neighboring network elements the clock status message including the timing source identifier of the single timing source.

17. The method according to claim 16, wherein:

said each network element includes a master network element having a reference clock that serves as a single reference timing source in the network; and at the master network element, said step (b) of selecting one of a plurality of signals disregards the clock signal supplied from the neighboring network element, if the timing source identifier received therefrom coincides with that of the reference clock of the master network element.

18. The method according to claim 11, wherein:
said each network element includes a master network element having a reference clock that serves as the single reference timing source in the network;
each of the network elements has a network element identifier pre-assigned thereto; and
said step (a) of producing and sending the clock status message includes sending to neighboring network elements the synchronization control data including the network element identifier of the master network element.

19. The method according to claim 18, wherein, at the master network element, said step (b) of selecting one of a plurality of clock signals disregards the clock signal supplied from the neighboring network element, if the network element identifier received therefrom coincides with the network element identifier of the master network element.

20. The method according to claim 11, wherein further comprising the step (c) of collecting the clock status messages and managing synchronization status of an entire network, based on the collected clock status messages.

* * * * *